(12) United States Patent
De Kermadec

(10) Patent No.: US 6,714,798 B1
(45) Date of Patent: Mar. 30, 2004

(54) TELEPHONE TERMINAL, REMOVABLE DATA MEDIUM PROVIDED WITH MEANS OF DELETING COMMON FUNCTIONS AND CORRESPONDING PROCESS FOR MANAGEMENT OF FUNCTION MENUS

(75) Inventor: M. Alain De Kermadec, Paris (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 0 days.

(21) Appl. No.: 09/540,961

(22) Filed: Mar. 31, 2000

(30) Foreign Application Priority Data

Apr. 1, 1999 (FR) .......................................... 99 04292

(51) Int. Cl.$^7$ ................................................. H04B 1/38
(52) U.S. Cl. ........................ 455/556; 455/557; 455/558; 455/410
(58) Field of Search ................................. 455/410, 403, 455/557, 558, 433, 556, 411, 418; 379/88.21

(56) References Cited

U.S. PATENT DOCUMENTS

| | | | | |
|---|---|---|---|---|
| 5,259,018 A | * | 11/1993 | Grimmett et al. | ........... 455/557 |
| 5,384,834 A | * | 1/1995 | Sato et al. | ............... 379/88.21 |
| 5,418,837 A | * | 5/1995 | Johansson et al. | .......... 455/558 |
| 5,687,216 A | * | 11/1997 | Svensson | .................... 455/558 |
| 5,764,730 A | * | 6/1998 | Rabe et al. | .................. 455/403 |
| 5,887,266 A | | 3/1999 | Heinonen et al. | |
| 5,913,175 A | * | 6/1999 | Pinault | ........................ 455/558 |
| 5,918,172 A | * | 6/1999 | Saunders et al. | ........... 455/557 |
| 5,920,826 A | * | 7/1999 | Metso et al. | ................. 455/557 |
| 5,933,773 A | * | 8/1999 | Barvesten | ................... 455/411 |
| 5,940,773 A | * | 8/1999 | Barvesten | ................... 455/558 |
| 6,185,436 B1 | * | 2/2001 | Vu | .............................. 455/558 |
| 6,427,076 B2 | * | 7/2002 | Skog | .......................... 455/433 |

FOREIGN PATENT DOCUMENTS

FR        2 761 219 A1    9/1998

* cited by examiner

Primary Examiner—Edward F. Urban
Assistant Examiner—Lana Le
(74) Attorney, Agent, or Firm—Kinney & Lange, P.A.

(57) ABSTRACT

A telephone terminal reads a removable data medium. The telephone terminal selects and/or adjusts a first function set. The removable data medium selects and/or adjusts a second function set. The telephone terminal deletes a function present in the second function set, from the first function set. A process manages function menus on a telephone terminal, and its corresponding removable data medium.

15 Claims, 4 Drawing Sheets

TELEPHONE TERMINAL, REMOVABLE DATA MEDIUM PROVIDED WITH MEANS OF DELETING COMMON FUNCTIONS AND CORRESPONDING PROCESS FOR MANAGEMENT OF FUNCTION MENUS

BACKGROUND OF THE INVENTION

This invention relates to the telecommunications field. More precisely, the invention relates to the implementation and use of telephone terminals.

In particular, this invention is applicable to telephone terminals designed to work in cooperation with a removable data medium (conventionally but not necessarily such as radio telephony terminals or fixed telephones). For example, in the latter case it is applicable to telephones equipped with a smart card reader, each user having a card defining his authorizations and/or options, so that he can use any telephone even if it is not his own.

In particular, but not exclusively, the telephone terminal according to the invention may specifically be a radio telephone (or Mobile Equipment, ME, in the GSM (Global System for Mobile communications) terminology) for example compatible with a GSM, DCS 1800 ("Digital Cellular System 1800 MHz"), PCS 1900 (Personal Communication System), DECT ("Digital European Cordless Telecommunications"), or UMTS ("Universal Mobile Telecommunication System") radiocommunications system.

Conventionally, telephone terminals offer a wide variety of settings, configuration, selection and usage of options, to the user. Different aspects of these first "functions" offered to the user are then presented. For example, the simplest functions are the adjustment of the volume, the screen brightness, and short numbering.

The removable data medium used in the above mentioned radio telephones is usually called the SIM card. According to standards in force at the present time, the radio telephone comprises means of reading and/or writing a subscriber identity module that can control the radio telephone. The subscriber identity module is usually called the SIM according to the GSM technology, or DAM (for DECT Authentication Mobile) according to the DECT terminology.

The SIM card also offers a number of functions to the user. In particular, it offers access to services provided by the operator who issued the card or by service providers approved by him.

This second function set may be viewed and used in a similar manner to the functions offered directly by the terminal, using the terminal screen and keypad.

The use of these two function sets, a first set corresponding to the terminal and a second set corresponding to the removable data medium, can cause technical and ergonomic difficulties.

Firstly, the presentations and uses may be different, which can cause some difficulties for the user.

Furthermore and more importantly, it is often found that the same function may be offered at the same time (possibly in a different form) firstly by the terminal and secondly by the removable data medium. In other words, some functions are present in both function sets ("duplicate" functions).

This situation creates a problem for the user who no longer knows where to find a specific function, in other words what menu to look in. Furthermore, the settings are not necessarily identical (for example an adjustment range from 1 to 5 for the volume in the terminal, and from 1 to 8 in the removable data medium).

Technically, this introduces unnecessary duplication of some means (particularly memory).

However it is impossible or difficult to include all functions in only one of the two sets. Some are specific to the terminal and others to the operator (and therefore to the removable object). Furthermore in some cases, the operator would like the function that he is offering to take priority over the function offered by the terminal (for example access to an Internet service).

BRIEF SUMMARY OF THE INVENTION

The main objective of this invention is to overcome these disadvantages in the state of the art.

More precisely, one of the objectives of this invention is to provide a technique that can optimize the management and use of functions available in a telephone terminal. In particular, one objective of the invention is to control and avoid the presence of "duplicate" functions, in other words to present a single function once only in the telephone terminal.

Another objective of the invention is to provide a technique for optimizing the use of the different functions and making them consistent with each other.

Another particular objective of the invention is to provide this type of technique that gives priority to functions offered by the operator.

Another objective of the invention is to provide such a telephone terminal capable of optimizing the allocation of available resources (particularly in terms of available memory capacity).

These various objectives, and others that will become clear later, are achieved according to the invention using a telephone terminal comprising means of reading a removable data medium, the said telephone terminal comprising first means of selection and/or adjustment of a first function set and the said removable data medium comprising second means of selection and/or adjustment of a second function set, characterized in that it comprises means of deleting a function present in the said second function set, from the first function set.

In other words, when a function is common to the function set for the telephone terminal and the function set for the removable data medium, only the corresponding function included within the function set provided on the removable data medium will be kept. Therefore, the invention proposes an improvement to the management of function sets available by deleting the "duplicate" function(s).

This very much simplifies the use of the different functions. The operator can adapt and homogenize the presentation of most functions, for example within one or several menus and/or submenus.

Advantageously, the said deletion is systematically, immediately that the removable data medium is inserted in the said telephone terminal.

Consequently, a user of the telephone terminal does not need to take any action in order to delete "duplicate" functions. This deletion takes place transparently to the user.

According to a first embodiment of the invention, the said telephone terminal comprises means of querying the said removable data medium about whether each of the functions in the first function set is present in the second function set, the said means being capable of deleting functions for each function for which the reply to the said query is positive.

In other words, the telephone terminal is in control and requests the removable data medium to provide it with information about its own function set in order to detect (after comparison) functions that were already included in the function set belonging to the telephone terminal, before deleting it or them.

In the second embodiment of the invention the said removable data medium comprises means of informing the said telephone terminal about functions common to the said first and second function sets, that the said removable data medium must delete from the said first function set.

In this case, the removable data medium manages deletion of the function(s) common to the two function sets available within the telephone terminal.

According to a third embodiment of the invention, the said removable data medium comprises means of supplying the said telephone terminal with the list of the said second function set, such that the said telephone terminal deletes functions common to the said first and second function sets from the first function set.

The telephone terminal then manages the deletion (and possibly prior comparison) of common functions starting from the list of functions provided by the removable data medium.

Advantageously, it applies to a radiocommunication system radio telephone.

Preferably, the said radiocommunication system belongs to the group comprising:

GSM type radiocommunication systems;

DCS 1800 type radiocommunication systems;

PCS 1900 type radiocommunication systems;

UPTS type radiocommunication systems;

DECT type radiocommunication systems.

Obviously, this list of radiocommunication systems is in no way restrictive.

Advantageously, the said removable data medium is at least partly included in a subscriber identity module.

In other words, the removable module may be the SIM card, or an independent card (or other).

The invention also relates to a process for the management of function menus used by the telephone terminal described above. In particular, this type of process comprises a step in which the said first function set deletes a function present in the said second function set.

The invention also relates to a removable data medium that could work in cooperation with the telephone terminal described above. In particular, this type of medium comprises means of deleting a function present in the said second function set, from the said first function set.

BRIEF DESCRIPTION OF THE DRAWINGS

Other characteristics and advantages of the invention will become clear after reading the following description of three preferred embodiments of the invention, given as simple examples for information and in no way restrictive, with reference to the attached drawings in which.

DETAILED OF THE DESCRIPTION

Therefore the invention relates to a telephone terminal that can manage the presence of "duplicate" functions within the telephone terminal.

In the rest of this description, the case of a radio telephone (or mobile telephone terminal) in a GSM type radiocommunication system is considered. However, it is clear that the invention is applicable to any type of telephone terminal (fixed or mobile). Those skilled in the art will easily be able to transpose the invention, particularly to the case of a fixed type telephone terminal.

Figure 1:
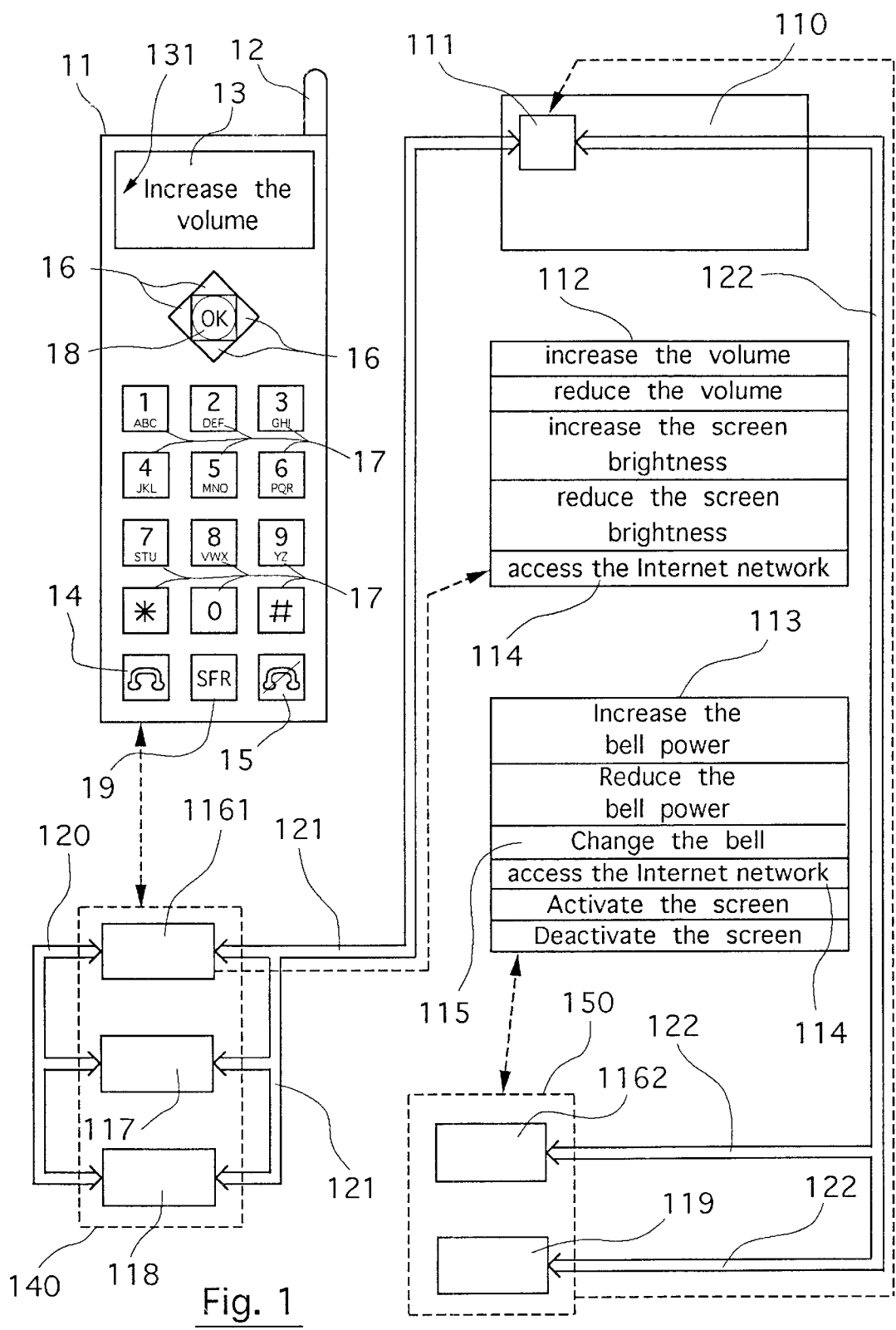
FIG. 1 illustrates a simplified diagram of a particular embodiment of a telephone terminal according to the invention.

We will now describe this type of telephone terminal making use of the invention with reference to the simplified diagram in FIG. 1.

Conventionally, a radio telephone terminal 11 comprises in particular:

an antenna 12 for exchanging signals (transmission and/or reception) with a base station (not shown);

a display screen 13, used particularly to display menus offering functions;

means 117, 118 for management of a first set 112 of functions stored in a memory 116, in which memory locations are provided for this purpose within the telephone terminal 11; and a keypad with a number of keys, particularly:

a take line key 14, used to setup a communication;

a break line key 15, used to break a previously setup communication;

horizontal and vertical movement keys 16 and/or scroll keys, particularly to move a cursor within the first menu and/or scroll through the functions in the first menu, on the first line of screen 13 facing a mark 131;

numbering keys 17 and/or alphanumeric data entry keys and/or code entry keys in order to dial a telephone number and/or enter a code and/or define a short message;

a selection key 18, used particularly to select a function within the menu displayed on screen 13. In the example illustrated, the selected function is the function located on the first line of screen 13, or the function facing the mark reference 131 ("increase the volume"); and a direct access key 19 to a main menu managed by an operator (for example such as the "SFR" (registered trademark) key) that a user of the telephone terminal 11 can use to access a second functions menu.

The first selection means 117 of the first function set 112 works in cooperation with the means 118 of adjusting the first function set 112. The first selection means 117 are used to select one function in the first function set 112. The first adjustment means 118 are used to access and/or adjust a function in the first function set 112, for example such as the function reference 114 ("access the Internet network"), in order to access the function concerned. The selection means 117 and the adjustment means 118 in the first function set are related to a first memory 1161 through a first link 120.

For example, the first memory 1161 may be included in the telephone terminal 11.

The second memory 1162 is advantageously integrated in the removable data medium described below.

The telephone terminal 11 works in cooperation with a removable medium that will be inserted in a corresponding reader in the telephone terminal 11. The removable data medium may for example be a subscriber identity module (SIM) module 110.

This subscriber identity module 110 comprises data processing and management means 111 that form a central decision making device. The data processing and management means 111 are used in particular to access the first memory 1161 through a second link 121, and also means 150 integrated in the subscriber identity module 110 through a third link 122.

In particular, these means 150 include a second memory 1162 that comprises a second function set 113.

The data processing and management means 111 are used to select and/or adjust at least some function(s) in the second function set 113 stored in memory 1162. Furthermore, the data processing and management means 111 are connected through the second link 121 to the first selection means 117 and to the first adjustment means, in order to be able to control these adjustment means.

The functions of the second set 113 may directly or indirectly affect the telephone terminal 11, for example such as the function reference 115 (represented by the "change bell for telephone call"). Similarly, for functions in the first set 112, each function in the second set 113 is accessible by using the main menu access key 19, through a second menu.

Obviously, the pair consisting of the telephone terminal 11 and the subscriber identity module 110 offers functions other than those shown, for example such as:

management of telephone numbers;

management of short messages;

management of preferred network operators;

management of a fixed list of call numbers to which the subscriber would like to restrict himself;

management of routing in the radiocommunication system concerned;

management of the mobile subscriber international identity number, according to IMSI-TMSI standards, management of characteristic data for the base station associated with the cell in which the telephone terminal 11 is located;

authenticating the subscriber with the network;

passively authenticating the subscriber by a secret PIN (Personal Identification Number) code;

access various services such as:
  access to the Internet network;
    access to an information and/or booking service (leisure, taxi, cinema, bank, etc.);
    contents of his account and/or communication credit time;

etc.

Therefore, these various functions include functions in the first and second function sets 112, 113, and at least some of them are managed through a SIM Application Toolkit (in the GSM terminology) that enables the subscriber identity module 110 to control the telephone terminal 11 with which it is cooperating. This toolkit is used respecting the GSM recommendation 11.11 phase $2^+$, which describes mechanisms enabling interoperability between the telephone terminal 11 and the subscriber identity module 110.

According to the invention, the telephone terminal 11 comprises means 119 of deleting a first function 114 present in the second function set 113 from the first function set 112. In other words, due to use of the process according to the invention, each function in the first function set 112 (stored in the first memory 1161) is distinct from each of the functions included in the second function set 113 (stored in the third memory 1163).

The deletion means 119 are preferably included in the subscriber identity module 110 and are connected through data processing and management means 111 and then the first link 120, to the first memory 1161.

According to a variant embodiment, the deletion means 119 may be included in the telephone terminal 11.

Deletion means 119 may compare the nature of each function in the first function set 112 with the nature of the function in the second function set 113 before deleting the common function(s) (from the first function set 112). For example, duplicate functions may be detected by analyzing the contents of each procedure used by the different functions.

The data processing and management means 111 in the subscriber identity module 110 control the deletion means 119 through a third link 122.

In particular, if necessary a new function may be added to the second function set 113 by downloading controlled by an operator and/or a service provider. A new function may also be included by revealing a function present in the second function set 113, for example when a user of the telephone terminal 11 takes out a new subscription with an operator and/or a service provider.

According to the invention, deletion takes place systematically provided that the subscriber identity module 110 is inserted in the reader of telephone terminal 11. Therefore, a user of the telephone terminal 11 does not need to be concerned about management of the first and second proposed function sets 112, 113 (and therefore the corresponding menus), which improves the user interface on the telephone terminal 11. For example, deletion may consist of hiding one function included in the second function set 113 (or possibly the first function set 112).

Figure 2:
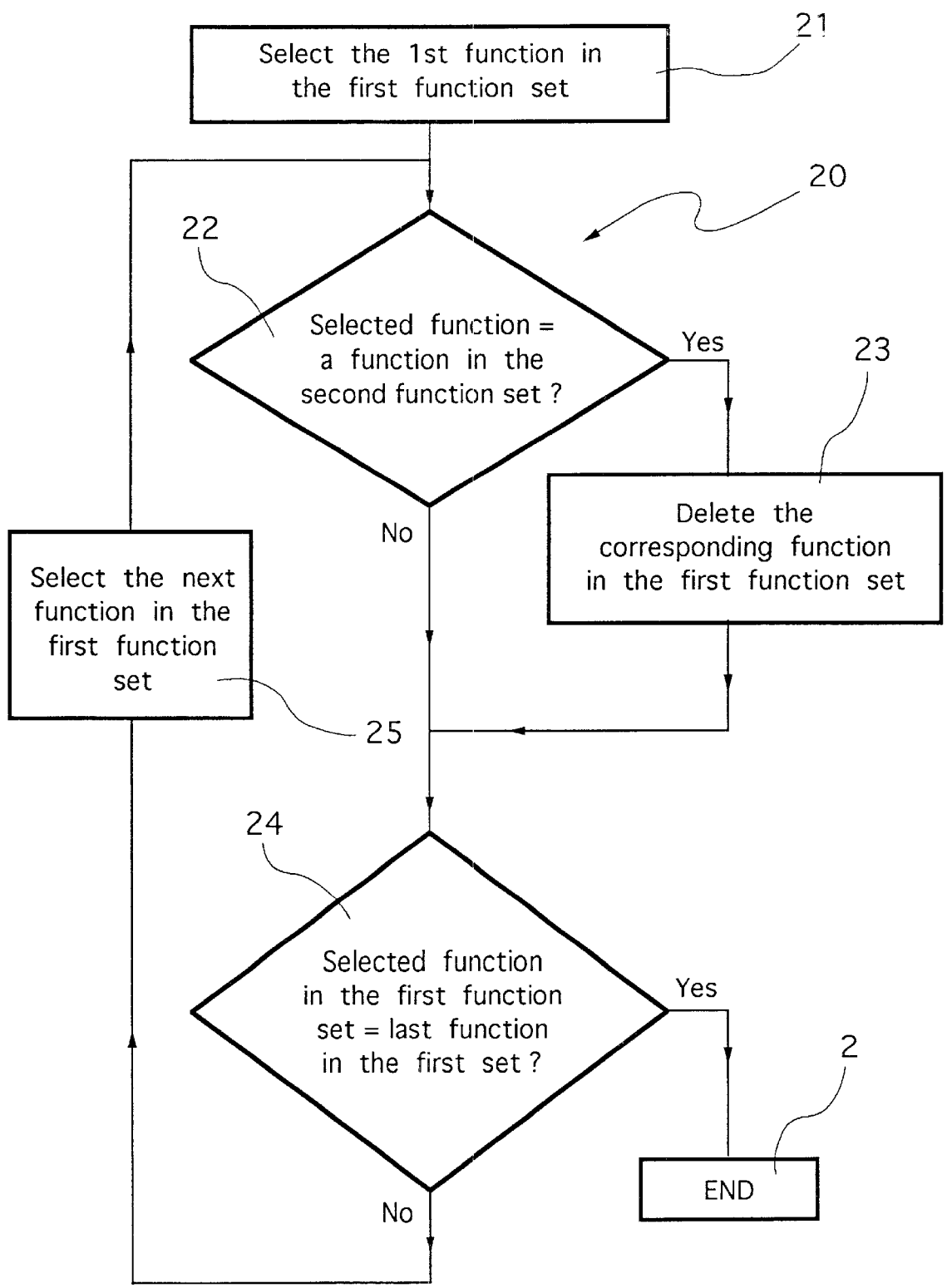
FIG. 2 shows a simplified flowchart of a first particular embodiment of a process for management of function menus that may be used within the telephone terminal in FIG. 1.
Figure 3:
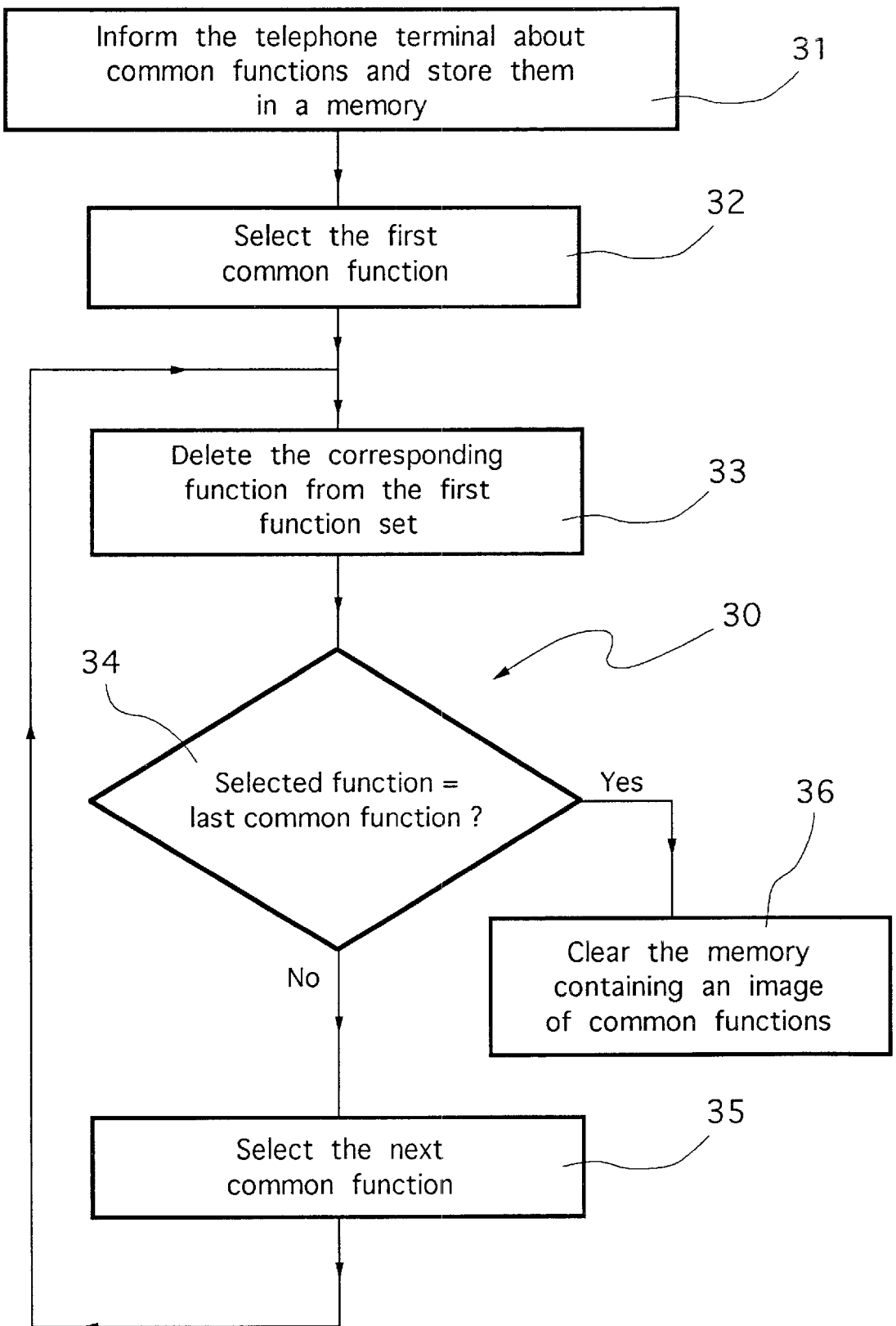
FIG. 3 illustrates a simplified flowchart of a second particular embodiment of a process for the management of function menus that may be used within the telephone terminal in FIG. 1.
Figure 4:
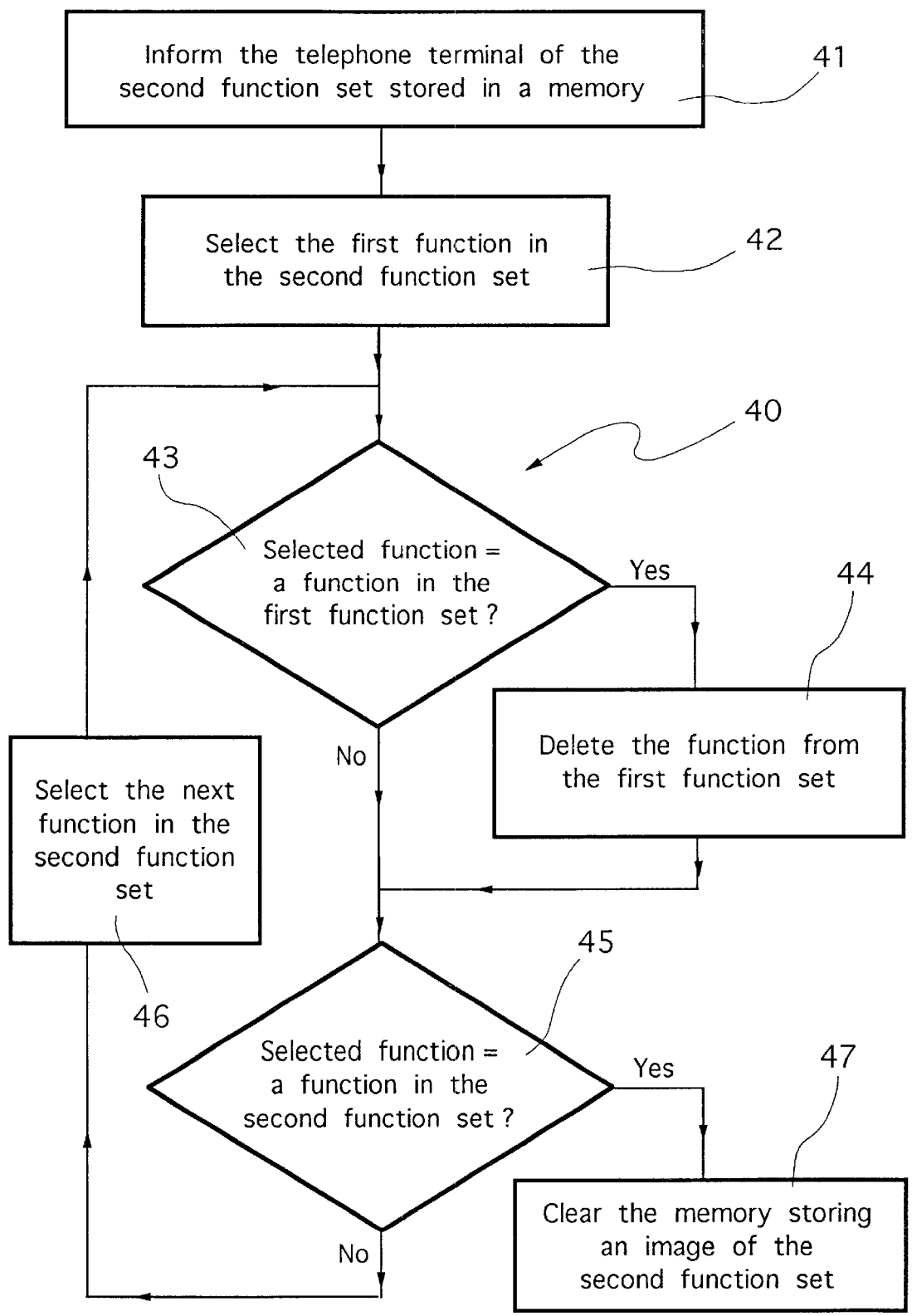
FIG. 4 illustrates a simplified flowchart of a third particular embodiment of a process for management of function menus that may be used within the telephone terminal in FIG. 1.

The following describes three particular embodiments of the process for management of function menus that may be used within the telephone terminal 11 (see FIG. 1), in relation to the three simplified flowcharts in FIGS. 2 to 4.

According to a first embodiment (see FIG. 2), the process 20 for the management of function menus comprises a step 21 in which the telephone terminal 11 selects the first function in the first function set 112.

The telephone terminal 11 performs a query step 22 on the subscriber identity module 110 about whether the selected function in the first function set 112 is present in the second function set 113. This query step 22 consists essentially of comparing the selected function (included in the first function set 112 related to the telephone terminal 11) with each function in the second function set 113 (related to the subscriber identity module 110) in order to detect if the selected function exists in the second function set 113.

If it does, in other words if the selected function in the first function set 112 corresponds to a function in the second function set 113, the telephone terminal 11 (controlled by data processing and management means 111, for example after observing at least some functions present in the second function set 113) decides to delete (23) the selected function from the first function set 112. Consequently, only the corresponding function remains present in the second function set 113. When functions already present in the second function set 113 have been deleted, the next step 24 is to analyze the position of the function within the first function set 112 described below.

Otherwise, in other words if the selected function in the first function set 112 is not included in the second function set 113, the telephone terminal 11 (controlled by data processing and management means 111) analyzes (24) if the selected function in the first function set 112 is the last function in the first function set 112.

If a new query procedure is necessary to determine if a function in the first function set 112 is present in the second function set 113 (in other words if the selected function in the first function set 112 is not the last function in the first function set 112), the telephone terminal 11 (controlled by the data processing and management means 111) selects (25) the next function in the first function set 112. The telephone terminal 11 then reiterates steps 22 to 25 described above until the last function in the first function set 112 has been selected.

Finally, when all functions in the first set 112 have been selected and then compared with the functions in the second function set 113 (and possibly some of them have been deleted), step 26 is applied which forms the end of the process for management of function menus.

According to one variant embodiment of the process according to the invention (not shown), the terms "first function set 112" can be replaced by the terms "second function set 113" in the above steps 21, 24 and 25, and the terms "second function set 113" can be replaced by the terms "first function set 112" in step reference 22.

According to a second embodiment of the invention (see FIG. 3), a function menu management process 30 comprises a step 31 in which the telephone terminal 11 is informed of functions common to the first and second function sets 112, 113. This information step 31 is based on the fact that the subscriber identity module 110 automatically informs the telephone terminal 11 about all functions already present within the second function set 113. For example, the telephone terminal 11 temporarily stores an image of all common functions (common to the first and second function sets 112, 113) in a buffer memory (not shown). Therefore, the telephone terminal 11 knows which functions it is required to delete within the first function set 112.

The telephone terminal 11 then selects (32) the first common function in the image of common functions (stored in the buffer memory).

The telephone terminal 11 then searches for and deletes (33) the function corresponding to this common function within the first function set 112.

When the common function has been deleted in the first function set 112, the telephone terminal 11 analyses (34) if the selected common function is the last of the common functions.

If not (in other words if the selected common function is not the last common function for which the corresponding function in the first function set 112 has already been deleted), the telephone terminal 11 selects (35) the next common function in the image of all common functions. The telephone terminal 11 then reiterates the above mentioned steps 33 to 35 until the function corresponding to the image of the last of the common functions has been selected and deleted.

When the selected common function (for which the corresponding function in the first function set 112 has already been deleted) is the last in the set of common functions (all "duplicate" functions having been deleted from the first function set 112), the telephone terminal 11 completely clears (36) the memory storing an image of the common functions. When the buffer memory is released, it can be used again particularly for another procedure to delete common functions within the first function set 112.

Finally, according to a third embodiment of the functions menu management process (see FIG. 4), the subscriber identity module 110 begins by its supplying (41) a complete list of functions in the second function set 113 to the telephone terminal 11. The telephone terminal 11 stores an image identical to the second function set 113 within a buffer memory, possibly temporarily.

The telephone terminal 11 then selects (42) the first function in the image of the second function set 113.

The telephone terminal 11 then compares (43) the selected function in the image of the second function set 113 with each function in the first function set 112.

When the telephone terminal 11 detects a function identical to the selected function, the telephone terminal 11 (controlled by the data processing and management means 111) deletes (44) the corresponding function in the first function set 112. The next step 45 comprises an analysis of the position of the function within the image of the second function set 113 described below.

If the telephone terminal 11 does not detect any function identical to the selected function in the first function set 112, the telephone terminal 11 (controlled by the data processing and management means 111) analyzes (45) if the selected function is the last function in the image of the second function set 113.

If not, in other words if a new procedure to compare another function in the second function set 113 is necessary, the next function in the second function set 113 is selected (46). Operations 43 to 46 are then repeated until the last function in the image of the second function set 113 has been selected.

Finally, when the selected function is the last function in the image of the second function set 113 (and therefore the necessary deletion(s) has (have) been made, the telephone terminal 11 (controlled by the data processing management means 111) clears (47) the image of the second function set 113 in the buffer memory in order to leave this space free for another use (possibly for storage of another image of a second function set 113).

What is claimed is:

1. A telephone terminal comprising means of reading a removable data medium, the telephone terminal comprising first means of selection and/or adjustment of a first function set and the removable data medium comprising second means of selection and/or adjustment of a second function set, characterized in that it comprises means of deleting a function present in the second function set, from the first function set, and characterized in that the deletion takes place systematically, immediately once the removable data medium is inserted in the telephone terminal.

2. The telephone terminal according to claim 1, characterized in that the removable data medium comprises means of informing the telephone terminal about functions common to the first and second function sets, that the removable data medium must delete from the first function set.

3. The telephone terminal according to claim 1, characterized in that the removable data medium comprises means of supplying the telephone terminal with the list of the second function set, such that the telephone terminal deletes functions common to the first and second function sets from the first function set.

4. The telephone terminal according to claim 1, characterized in that it applies to a radio telephone in a radiocommunication system.

5. The telephone terminal according to claim 4, characterized in that the radiocommunication system belongs to the group comprising:

GSM type radiocommunication systems;
DCS 1800 type radiocommunication systems;

PCS 1900 type radiocommunication systems;

UMTS type radiocommunication systems;

DECT type radiocommunication systems.

6. The telephone terminal according to claim 1, characterized in that the removable data medium is at least partly included in a subscriber identity module.

7. The telephone terminal according to claim 1, wherein the telephone terminal queries the removable data medium about whether each of the functions in the first function set is present in the second function set, and deletes a function for which the reply to the said query is positive.

8. A removable data medium designed to work in cooperation with a telephone terminal including means of reading a removable data medium and means of selection and/or adjustment of a first function set, the removable data medium comprising:

a memory for storing a second function set; and means for selecting or adjusting the second function set, wherein the means for selections or adjusting the second function set comprises means of deleting a function present in the second function set from the first function set, and wherein the deletion takes place systematically, immediately once the removable data medium is inserted in the telephone terminal.

9. A system for eliminating duplication between function sets in a telephone terminal, the telephone terminal having a memory and one or more removable data media, the telephone terminal comprising:

a first function set stored in a memory, the first function set having a plurality of functions;

a first means of selection and adjustment of the first function set, the first means of selection and adjustment comprising means of deleting a selected function of the first function set;

a second function set stored in the one or more removable data media;

a second means of selection and adjustment of the second function set;

wherein the first means of selection and adjustment comprises:

means for selecting a function in the first function set and querying the one or more removable data media to determine whether the selected function in the first function set matches one of the functions in the second function set for all of the functions in the first function set; and wherein a match between the selected function in the first function set with a function in the second function set causes the selected function to be deleted from the first function set, and wherein the deletion takes place systematically, immediately once the removable data medium is inserted in the telephone terminal.

10. A telephone terminal comprising means of reading a removable data medium, the telephone terminal comprising first means of selection and/or adjustment of a first function set and the removable data medium comprising second means of selection and/or adjustment of a second function set, characterized in that it comprises means of deleting a function present in the second function set, from the first function set, characterized in that the removable data medium comprises means of supplying the telephone terminal with the list of the second function set, such that the telephone terminal deletes functions common to the first and second function sets from the first function set, and further characterized in that the deletion takes place systematically, immediately once the removable data medium is inserted in the telephone terminal.

11. A telephone terminal comprising means of reading a removable data medium, the telephone terminal comprising first means of selection and/or adjustment of a first function set and the removable data medium comprising second means of selection and/or adjustment of a second function set, characterized in that it comprises means of deleting a function present in the second function set, from the first function set, characterized in that the removable data medium comprises means of informing the telephone terminal about functions common to the first and second function sets, that the removable data medium must delete from the first function set, and further characterized in that the deletion takes place systematically, immediately once the removable data medium is inserted in the telephone terminal.

12. A method of deleting duplicative functions in a telephone terminal having a first function set and a removable data medium containing a second function set, the method comprising:

reading the removable data medium to identify the second function set;

querying the telephone terminal about whether each function in the first function set is present in the second function set; and deleting matching functions from the first function set, wherein the deletion takes place systematically, immediately once the removable data medium is inserted in the telephone terminal.

13. A telephone terminal system comprising:

a telephone terminal comprising a first function set; and a removable data medium comprising a second function set, the removable data medium being insertable and removable from the telephone terminal, wherein the telephone terminal system compares the first function set with the second function set and deletes a function present in the second function set from the first function set, immediately once the removable data medium is inserted in the telephone terminal.

14. The telephone terminal system of claim 13, wherein comparing the first function set with the second function set and deleting a function present in the second function set from the first function set is controlled by an application tool residing in the removable data medium.

15. The telephone terminal system of claim 13, wherein comparison and deletion takes place systematically once the removable data medium is inserted in the telephone terminal.

* * * * *

UNITED STATES PATENT AND TRADEMARK OFFICE
CERTIFICATE OF CORRECTION

PATENT NO. : 6,714,798 B1
DATED : March 30, 2004
INVENTOR(S) : De Kermadec

It is certified that error appears in the above-identified patent and that said Letters Patent is hereby corrected as shown below:

Title page,
Item [56], References Cited, OTHER PUBLICATIONS, insert -- GSM Technical Specification, Digital Celluar Telecommunication System (Phase 2+); Specification of the SIM Application Toolkit for the Subscriber Identity Module - Mobile Equipment (SIM-ME) Interface", July 1997, pages. 1-56 --

Column 3,
Line 32, delete "UPTS", insert -- UMTS --

Column 9,
Line 19, delete "selections", insert -- selecting --

Signed and Sealed this

Twenty-eighth Day of June, 2005

JON W. DUDAS
*Director of the United States Patent and Trademark Office*